Aug. 12, 1958  J. U. DALY  2,846,884
TEMPERATURE RESPONSIVE DEVICE
Filed Aug. 5, 1955

INVENTOR.
JAMES U. DALY
BY
HIS ATTORNEY.

United States Patent Office

2,846,884
Patented Aug. 12, 1958

2,846,884

TEMPERATURE RESPONSIVE DEVICE

James U. Daly, Latrobe, Pa., assignor to Robertshaw-Fulton Controls Company, Greensburg, Pa., a corporation of Delaware Application August 5, 1955, Serial No. 526,760

10 Claims. (Cl. 73—362.4)

This invention relates to thermally responsive devices of the hydraulic type used for regulating or indicating temperatures and, more particularly, the temperature sensing elements of such a device.

Devices of this character generally include an expansible element which may be connected to a control or indicating device wherein temperature responsive movement is required and a temperature sensing bulb connected to the expansible element by a length of capillary tubing. The temperature sensing element, capillary tube, and expansible element comprise a closed system which is filled with fluid under pressure.

In a typical application of such a system, the temperature sensing element is positioned to be exposed to a variation of the temperature condition while the expansible element is connected to a control or indicating device. Should the temperature of the temperature sensing element increase, the temperature of the fluid therein also increases, resulting in an increase in volume of the fluid. Since the expansible element is the only element in the system having a variable volume, the increase in volume of the liquid within the bulb is transmitted through the liquid in the capillary tube to cause expansion and movement of the expansible element which in turn causes movement of the indicating or control device to which it is connected. If a decrease in temperature of the temperature sensing element occurs, the liquid within the temperature sensing element will contract resulting in contraction or movement of the expansible element in an opposite direction.

While the above described system is capable of efficient temperature indication, systems of this type have been found to be influenced by several well-known adverse effects which prohibit their use in applications requiring extremely sensitive and accurate response to temperature variations. As hereinbefore described, theoretically, the expansible element is the only element in the system having a variable volume. If this were true in practice, the system would give perfect indication of temperature variations. However, it is well known in the art that the volume of the temperature sensing element will also vary with the temperature variations as a result of expansion and contraction of its wall and thus will introduce a substantial error in the system. As the temperature of the temperature sensing element increases, the volume of the fluid therein will increase, but the volume of the temperature sensing element also increases a slight amount. Thus, expansion of the expansible element is substantially less than the expansion which would occur if the volume of the sensing element remained constant and as a result does not give a true indication of the temperature increase. The opposite would be true for decrease in temperature.

Another disadvantage of such a system is its slow response to a temperature variation. The response of the system is dependent upon the heating rate of fluid within the temperature sensing element, and there will be a definite lag in response since heat must flow through the walls of the sensing element to the fluid therein. Thus, the rate of response is proportional to the rate of heat flow through the walls of the temperature sensing element and the heating rate of the fluid therein.

It is an object of this invention to incorporate in a thermally operated device, a temperature sensing element having a volume which is substantially independent of temperature variations.

Another object of this invention is to eliminate the need to compensate for variations in the volume of the temperature sensing element.

Another object of this invention is to incorporate in a thermally responsive device, a temperature sensing element which will anticipate a temperature condition and prevent overshoot.

Another object of this invention is to incorporate in a thermally responsive device, a temperature sensing element whose rate of response to temperature variations is not dependent upon the heating rate of fluid therein.

In a preferred embodiment of the invention, an expansible element of a well-known type is connected by a suitable capillary tube to a novel temperature sensing element. The temperature sensing element is provided with a bimetal wall which is thermally responsive to the temperature of the surrounding medium to maintain the volume of the temperature sensing element substantially unaffected by temperature variations. A portion of the bimetal wall is insulated to reduce the thermally responsive effect of the same whereby the temperature sensing element will anticipate the temperature condition of the surrounding medium.

Other objects and advantages will become apparent from the following description taken in connection with the accompanying drawing wherein.

Figure 1:
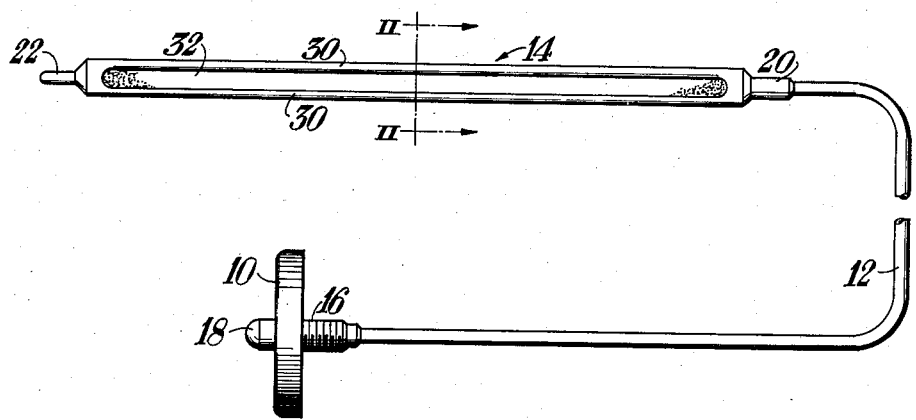
Fig. 1 is a front elevation of a thermally responsive device including a temperature responsive element embodying this invention.

Referring more particularly to the drawing, the thermally responsive device may comprise an expansible element and capillary tube of any suitable type, however, for purposes of description the power element is shown as an expansible diaphragm element 10, which may be formed of a pair of corrugated discs and connected by a capillary tube 12 to a temperature responsive element 14. One end of the diaphragm element 10 is provided with an extending threaded stud 16 by means of which the diaphragm element 10 may be fixed to a suitable support or wall of a control or indicating device (not shown). The other end of the diaphragm element 10 carries an operating button 18 which is movable relative to the fixed end or stud 16 in response to expansion or contraction of the diaphragm element 10. The button 18 may be arranged to operate the usual switch, valve or the like (not shown). The stud 16 and diaphragm element 10 are suitably bored to permit fluid from the capillary tube 12 to enter the diaphragm element 10.

This invention is more particularly directed to the temperature sensing element 14 of the assembly. This element 14 is of generally tubular configuration and is provided with a small diameter end 20 which may be connected to one end of the capillary tube 12 by soldering, welding or any other suitable fluid type connection. The other end 22 of the temperature sensing element 14 is also of reduced diameter and may be left open in order that the system may be charged with a suitable fluid under pressure which undergoes volumetric changes in response to temperature variations. After the system is charged with the fluid, the open end 22 of the temperature sensing element 14 may be permanently sealed by flattening or crimping the wall thereof.

Figure 2:
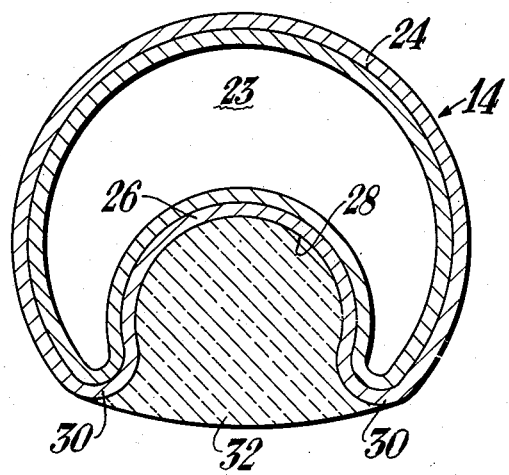
Fig. 2 is an enlarged cross-section taken on the line II—II of Fig. 1.

Referring more particularly to Fig. 2, the temperature sensing element 14 may be formed from a sheet of any known bimetallic material with the high expansion side preferably defining the exterior surface of the temperature sensing element 14. The temperature sensing element 14 defines a chamber 23 for fluid and an enclosing wall having a convexly-shaped portion 24 and a concavely-shaped portion 26. The concavely-shaped portion 26 defines a recess 28 and a pair of pincer-like legs 30, 30 at the intersection of the portions 24, 26.

As can be seen in Fig. 1, the cross-section shown in Fig. 2 is substantially symmetrical over the entire length of the temperature sensing element 14. Since the high expansion side of the bimetallic material defines the exterior surface of the sensing element 14, an increase in temperature of the portion 24 will cause deflection of legs 30, 30 toward each other. However, an increase in temperature of the portion 26 will tend to separate the legs 30, 30 and oppose deflection of the legs 30, 30 by the portion 24.

The recess 26 is filled with a flexible insulating substance 32 which may be of any suitable type that will flex or change shape readily. The insulation 32 is operative to retard the flow of heat to the portion 26 for a purpose which will become apparent from the description of the operation which now follows.

In operation, it will be assumed that the button 18 is positioned to operate a controlling mechanism such as a valve or switch mechanism for controlling the temperature of a medium in which the temperature sensing element 14 is positioned. If the temperature of the medium is constant and corresponds to the control temperature of the mechanism which the diaphragm element 10 operates, the sensing element 14 and liquid therein will also be at a constant temperature.

Assume now as a first condition that the temperature of the medium has increased. The portion 26 being insulated by the material 32 will not be affected by the temperature increase until heat flows through the convex wall 24 and the fluid within the element 14 to the wall 26. Thus, the insulation 32 prevents the increased temperature from affecting the bimetal wall 26 until the fluid within the chamber 23 is heated to the increased temperature.

However, the convex portion 24 being directly exposed to the temperature increase will immediately warp in response to heating thereof and cause flexing of the legs 30, 30 toward each other to a new position. It can be seen that this flexing of the legs 30, 30 will reduce the cross-sectional area of the sensing element 14 and thus the volume of the chamber 23 and fluid therein. This resulting decrease in volume of the sensing element 14 will cause a quantity of liquid to be injected into the diaphragm element 10 to cause expansion thereof and actuation of the control mechanism to which the element 10 is connected.

The above described action of the bimetal portion 24 occurs immediately upon an increase in temperature and before the major mass of fluid within the chamber 23 is affected by the temperature increase. Thus, the temperature sensing element 14 anticipates the fluid expansion in response to temperature increase and instantly expands the diaphragm element 10.

The convex wall portion 24 will remain in this warped or reduced volume position while heat flows through the fluid gradually expanding the same and at the same time heating the concave wall portion 26. As the concave insulating portion 26 is gradually heated to the increased temperature it deforms in such a manner to oppose the above described deformation of the convex portion 24 and move the legs 30, 30 toward their original position thereby restoring the temperature sensing element 14 to its original volume. Since the volume of the sensing element 14 is now at its original value, the expanded condition of the fluid within the chamber 23 will determine the position of the diaphragm 10. Thus, the bimetal wall of the sensing element 14 merely anticipates the fluid expansion until the fluid is heated to the increased temperature and does not affect the control point or temperature of expansible element 10.

Assuming now a decrease in temperature of the medium from the initial constant temperature condition, it can be seen that the reverse of the above described operation will occur. The convex wall portion 24 being exposed directly to the lower temperature condition will immediately be affected and flex the legs 30, 30 outward to increase the volume of the sensing element 14. This increased volume of the sensing element 14 withdraws a quantity of fluid from the diaphragm element 10 causing immediate contraction thereof to anticipate the contracted condition of the liquid in the sensing element 14.

As the liquid within the sensing element 14 gradually cools and contracts, the concave wall portion 26 will be affected by the temperature decrease to oppose the position of the convex wall portion 24 and return the sensing element 14 to its original configuration and volume wherein the contracted condition of the liquid will determine the control point of the diaphragm element 10.

The anticipating effect of the element 14 may be eliminated by removing the insulating material 32 from the recess 28. In this condition both wall portions 24, 26 will immediately be affected upon a temperature change and become operative to maintain the volume of the element 14 constant and independent of the temperature changes of the element 14 without the anticipating effect obtained through use of the insulating material 32.

While only one embodiment of the invention has been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In a thermally responsive control device having an expansible and contractible element, a capillary tube and a bulb containing a temperature sensitive fluid, the bulb being constructed of layers of metal of different coefficients of expansion autogenously joined to form a tubular member of substantially circular cross-section interrupted by a re-entrant portion which defines by its outer wall a longitudinal groove extending substantially the entire length of said member, and a flexible insulating material filling said groove.

2. In a thermally responsive control device having an expansible and contractible element, a capillary tube and a bulb containing a temperature sensitive fluid, the bulb being constructed of layers of metal of different coefficients of expansion autogenously joined to form tubular member substantially circular in cross-section interrupted by a re-entrant portion which defines by its outer wall a longitudinal groove extending substantially the length of said member, and flexible insulating material filling said groove and operable to retard thermal expansion and contraction of said outer wall portion whereby said circular portion is capable of expansion and contraction in response to temperature changes in advance of said outer wall portion.

3. In a thermally responsive control device having an expansible and contractible element, a capillary tube and a bulb contacting a temperature sensitive fluid, the bulb comprising a bi-material, substantially tubular member having an elongated recess in the wall thereof defining a pair of opposed, pincer-like legs on said member and a chamber therein bound by convex and concave wall portions, said wall portions coacting when undergoing thermal expansion and contraction to oppose the movement of said pincer-like legs to thereby prevent changes in the volume of said chamber.

4. In a thermally responsive control device having an expansible and contractible element, a capillary tube and a bulb containing a temperature sensitive fluid, the bulb comprising a bi-material, substantially tubular member having an elongated recess therein defining a pair of opposed, pincer-like legs on said member and defining a fluid chamber therein bound by convex and concave wall portions, said recess carrying insulating means therein for retarding the thermal expansion and contraction of said concave wall portion whereby the convex wall portion of said member thermally expands and contracts in advance of said concave wall portion to anticipate the thermal expansion and contraction of the fluid in said member and to insure substantially instantaneous movement of said expansible and contractible element in response to changes in a temperature condition.

5. In a thermally responsive control device having an expansible and contractible element, a capillary tube and a bulb containing a temperature sensitive fluid, the bulb comprising a substantially tubular member having a bi-material wall with an elongated and insulated recess in said wall defining a pair of opposed pincer-like legs on said member and defining a chamber therein bound by a convex wall portion and an insulated concave wall portion, said wall portions being cooperable with said pincer-like legs when undergoing thermal expansion and contraction to first anticipate the thermal expansion and contraction of the fluid in said chamber and thereafter to stabilize the volume of said chamber at a predetermined value.

6. In a thermally responsive control device having an expansible and contractible element, a capillary tube and a bulb containing a temperature sensitive fluid, the bulb comprising a substantially tubular member having a bi-material wall with an elongated and insulated recess in said wall defining a pair of opposed, pincer-like legs on said member and a chamber therein bound by a convex wall portion and an insulated concave wall portion, said wall portions coacting with said pincer-like legs when undergoing thermal expansion and contraction to stabilize the volume of said chamber at a predetermined value whereby the controlling positions of said expansible and contractible element are determined by the thermal expansion and contraction of the fluid in said chamber.

7. A fluid-filled temperature sensitive means for a thermally responsive control device comprising a substantially tubular member having a wall formed of a plurality of layers of dissimilar metals autogenously joined and provided with a re-entrant portion forming an elongated recess in said wall and defining a chamber in said member being bound by convex and concave wall portions, and an insulating material filling said recess and being operable for retarding the thermal expansion and contraction of one of said wall portions in response to changes in a temperature condition.

8. A fluid-filled temperature sensitive means for a thermally responsive control device comprising a substantially tubular member having a wall of dissimilar materials and provided with an elongated recess in said wall defining a pair of opposed, pincer-like legs on said member and defining a chamber in said member bound by convex and concave wall portions, said dissimilar materials in said wall having different coefficients of thermal expansion and said recess in said wall carrying therein a flexible insulating material.

9. A thermostatic control device of the thermo-responsive fluid type including expansible and contractible means, conduit means and temperature sensitive means, said temperature sensitive means being comprised of a hollow, tubular member of substantially circular cross-section constructed of layers of metal of dissimilar coefficients of expansion autogenously united and provided with a re-entrant portion defining an elongated recess interrupting said circular cross-section and defining convex and concave wall portions that terminate in a pair of opposed, pincer-like legs on said member, said wall portions when undergoing thermal expansion and contraction being deflected in opposite directions at said pincer-like legs whereby the inner volume of said tubular member remains unchanged.

10. A thermostatic control device of the thermo-responsive fluid type including expansible and contractible means, conduit means and temperature sensitive means, characterized in that the temperature sensitive means is comprised of a hollow, substantially tubular member having a wall of layers of dissimilar materials and provided with an elongated recess in said wall defining convex and concave wall portions that terminate in a pair of opposed, pincer-like legs on said member, said recess filled with a flexible insulating material to retard the thermal expansion and contraction of said concave wall portion in response to changes in a temperature condition whereby said convex wall portion is capable of anticipating the thermal expansion and contraction of said fluid in said member.

References Cited in the file of this patent

UNITED STATES PATENTS

| | | |
|---|---|---|
| 2,112,038 | McLenegan | Mar. 22, 1938 |
| 2,392,613 | Persons | Jan. 8, 1946 |
| 2,487,686 | Zuehlke | Nov. 8, 1949 |